United States Patent [19]
Blin

[11] Patent Number: 5,183,079
[45] Date of Patent: Feb. 2, 1993

[54] HEAT AND FIRE RESISTANT PROTECTIVE COVERING FOR HOSES, CABLES AND THE LIKE

[75] Inventor: Philippe Blin, Monts, France

[73] Assignee: Hutchinson S.A., Paris, France

[21] Appl. No.: 548,142

[22] Filed: Jul. 3, 1990

[30] Foreign Application Priority Data

Jul. 5, 1989 [FR] France .................. 89 09034

[51] Int. Cl.⁵ .................. F16L 11/12; F16L 59/14
[52] U.S. Cl. .................. 138/110; 138/103; 138/149; 138/124; 138/125; 138/127; 138/178; 174/121 A
[58] Field of Search .............. 138/103, 110, 149, 124, 138/125, 126, 127, 178; 174/121 A

[56] References Cited

U.S. PATENT DOCUMENTS

| 397,822 | 2/1889 | Suhr | 138/149 |
|---|---|---|---|
| 2,377,317 | 6/1945 | Blume | 138/149 |
| 2,405,330 | 8/1946 | Ryder | 138/149 |
| 3,576,940 | 5/1971 | Stone et al. | 174/121 A |
| 3,900,701 | 8/1975 | Bayles et al. | 174/121 A |
| 3,948,295 | 4/1976 | Lemont et al. | 138/149 |
| 4,046,406 | 9/1977 | Press et al. | 138/149 |
| 4,064,359 | 12/1977 | Peterson et al. | 174/121 A |
| 4,181,157 | 1/1980 | DeCamp | 138/110 |
| 4,251,590 | 2/1981 | Rubright et al. | 138/149 |
| 4,259,989 | 4/1981 | Lalikos et al. . | |
| 4,450,872 | 5/1984 | Orcutt | 138/149 |
| 4,452,279 | 6/1984 | Atwell . | |
| 4,543,281 | 9/1985 | Pedersen et al. | 138/148 |
| 4,549,041 | 10/1985 | Shingo et al. | 174/121 A |
| 4,573,400 | 3/1986 | Foy | 138/149 |
| 4,673,002 | 6/1987 | Scanlon et al. | 138/149 |

FOREIGN PATENT DOCUMENTS

53-9395 4/1978 Japan .................. 174/121 A

*Primary Examiner*—James E. Bryant, III
*Attorney, Agent, or Firm*—Bell, Seltzer, Park & Gibson

[57] ABSTRACT

A fire-proofing protective covering for an elongate structure such as a hose, an electrical or optical cable, or pneumatic or hydraulic ducting, comprises: a first plurality of layers made of an inorganic material having a structure which is suitable for imprisoning air while still allowing the operation of the elongate structure to be maintained at relatively high temperatures, of the order of at least 850° C., and for a given length of time, of the order of at least several minutes, and a second plurality of layers, with each of the layers being disposed alternately relative to each of the layers of the first plurality so that the layers of the first plurality are on the inside while the layers of the second plurality are made of a material which substantially constitutes a barrier for the air imprisoned in the corresponding layer of the first plurality. The invention is applicable to the opto-electrical industry, to the hydraulic industry, etc. ... for protecting ducting from fire.

4 Claims, 1 Drawing Sheet

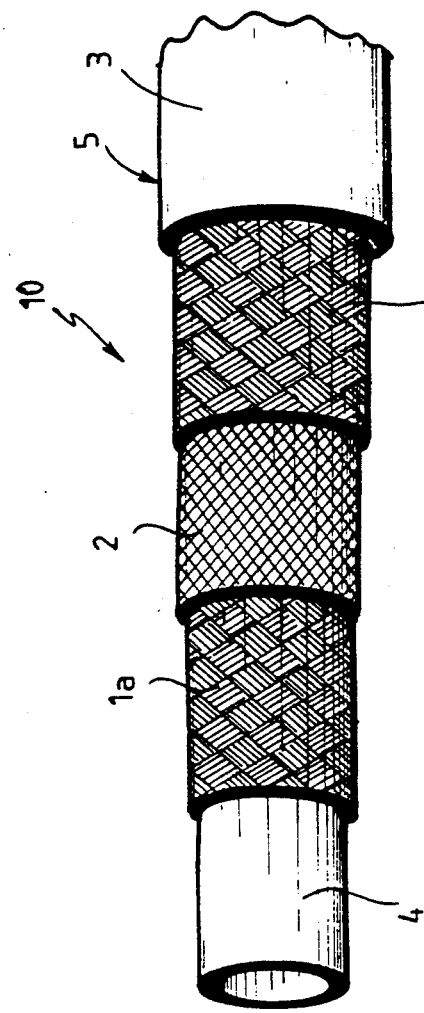
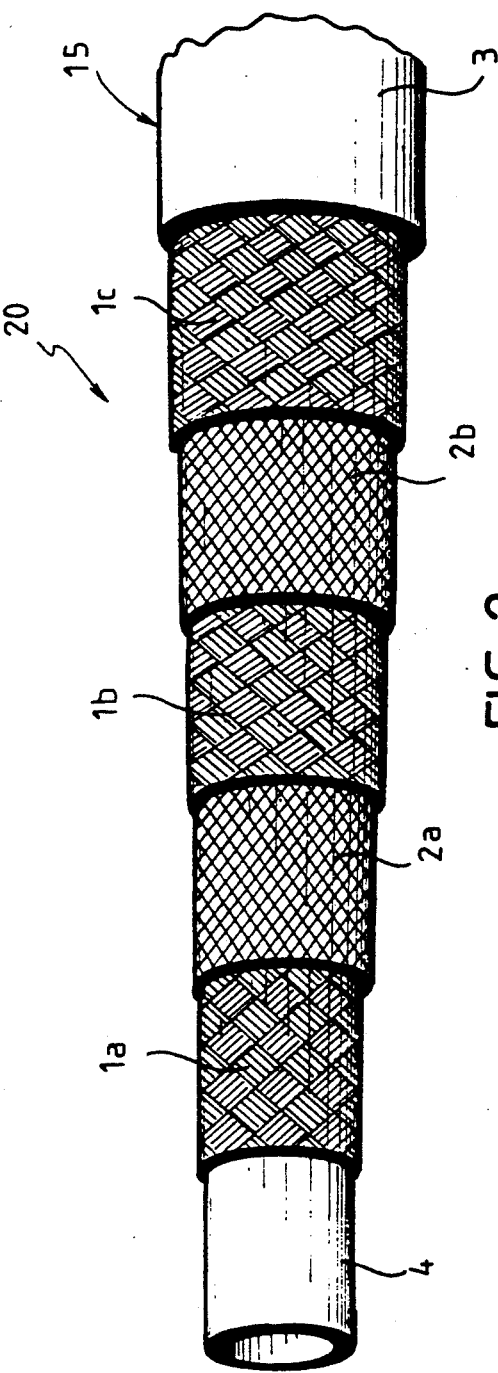

HEAT AND FIRE RESISTANT PROTECTIVE COVERING FOR HOSES, CABLES AND THE LIKE

The present invention relates to a protective covering providing protection against the action of heat and of fire, and more particularly intended for structures of elongate shape such as electrical or optical cables and pneumatic or hydraulic ducting, etc.

BACKGROUND OF THE INVENTION

With such pipes, cables, and ducts, there exists a problem of conserving the function for which they are designed (i.e. conveying a fluid under pressure, electrical energy, information, etc.) in the presence of fire and at relatively high temperatures, about 850° C., and to continue doing so for a given length of time during which safety conditions are ensured.

One of the known existing solutions is that described in French patent application FR-86 17740, which is now French Patent 2,591,715, which solution is represented by a protective sheath comprising:

a wrapping comprising a plurality of layers of inorganic material;

a tight winding disposed over said wrapping and made of a thread or strip of material that withstands temperature; and a sheath surrounding the winding and constituting a compression sleeve, the sheath also being made of a substance that withstands heat and/or fire.

More precisely, the above-mentioned inorganic material is constituted by mica which is supported by the inside face of a strip of glass silk, so as to facilitate application thereof around the pipe. The winding is constituted by strips of glass silk covered on their outside faces with aluminum so as to reflect heat. The sheath forming a compression sleeve is constituted by a woven cloth of material that withstands heat and/or fire. Between the winding and the compression sleeve, it is also possible to dispose a heat-distributing ceramic sheath made from threads of ceramic fibers, optionally coated in metal. An additional casing, in particular made of fire resistant silicone rubber and having tear strength may be applied to the outside of the above-described stratified protection structure for a pipe.

However, the above-outlined prior art solution suffers, like other prior art solutions, from the drawback of changing the pipe's own (static) flexibility, or in general, the flexibility of the elongate structure which is to be protected in this way. Further, these solutions increase dynamic stiffness and consequently noise generation in the event of vibration, and this can be unacceptable in some applications, particularly in submarines.

The object of the present invention is thus to provide a covering for an elongate structure such as pipework, electric or optical cables, and pneumatic or hydraulic ducting, which covering is more practical than previously known coverings for the same purpose, particularly in that, while ensuring that the structures continue to function for a given length of time as required for maintaining acceptable emergency conditions, it retains the static flexibility of the structures to be protected and provides little change to the dynamic stiffness thereof, producing little noise, even under difficult conditions of temperature, in particular when a fire breaks out, during which relatively high temperatures may be developed of about 850° C. or even more, while not giving off toxic substances, in particular those based on halogens, phosphorus, etc. . . .

SUMMARY OF THE INVENTION

The present invention provides a protective covering for an elongate structure such as a hose, an electrical or optical cable, or pneumatic or hydraulic ducting, wherein the covering comprises:

a first plurality of layers made of an inorganic material having a structure which is suitable for imprisoning air while still allowing the operation of said elongate structure to be maintained at relatively high temperatures, of the order of at least 850° C., and for a given length of time, of the order of at least several minutes, and a second plurality of layers, with each of said layers being disposed alternately relative to each of the layers of the first plurality so that the layers of the first plurality are on the inside while the layers of the second plurality are made of a material which substantially constitutes a barrier for the air imprisoned in the corresponding layer of the first plurality.

In an advantageous embodiment of the covering of the invention, each layer imprisoning air is constituted by a woven layer, in particular based on a ceramic braid, cloth, knit, or textile sheet, while each layer constituting an air barrier is constituted by a film based on fire-resistant silicone elastomer, with the outside surface of each layer in the first plurality of layers being coated therewith.

In a preferred variant of this embodiment, each layer constituting an air barrier is constituted by a two-part composite layer, with the inner part being made on the basis of silica and alumina and the outer part being made of a film based on fire-resistant silicone elastomer.

In another variant of the preferred embodiment, the above-mentioned two-part composite layers constitute internal barriers while the external barrier is constituted by a film based on fire-resistant silicone elastomer.

In yet another variant of the advantageous embodiment, the internal barriers for air are made solely of silica and alumina, whereas the external barrier is made of a film based on a fire-resistant silicone elastomer.

In addition to the above dispositions, the invention also includes other dispositions which appear from the following description.

BRIEF DESCRIPTION OF THE DRAWING

An embodiment of the invention is described by way of example with reference to the accompanying drawing, in which:

FIG. 1 is a perspective and partially cut-away view of one embodiment of a covering of the invention and corresponding to a minimal structure therefor;

FIG. 2 is likewise a partially cut-away perspective view of an embodiment of the covering of the invention which corresponds to a more fully-provided structure compared with the minimum structure shown in FIG. 1; and FIG. 3 is a perspective and partially cutaway view showing an electrical or optical cable similar to that of FIG. 1 and additionally including an outer layer of metal cloth.

DETAILED DESCRIPTION

It should nevertheless be understood that the drawing and the corresponding portions of the description are given purely by way of illustration of the subject matter of the invention and that they do not constitute limitations on the scope thereof.

The applicant has made two prototypes, one which corresponds to a minimum structure as shown in FIG. 2 and the other of which corresponds to a more fully-provided structure and is illustrated in FIG. 2. Both of these structures give satisfaction, as can be seen from test results, mentioned below.

The first prototype 10 comprises a covering 5 constituted by two ceramic braids 1a and 1b on either side of a refractory layer 2 based on silica and alumina, with all three layers being coated with a film 3 based on a silicone elastomer which is made fire-resistant by incorporating a mineral filler therein, preferably of the type that does not include components containing halogen or phosphorus, etc. so as to avoid giving off toxic substances when the elastomer is subjected to the action of heat and/or fire.

This covering is applied around a flexible pipe or hose 4. Each of the ceramic braids 1a, 1b is an excellent example of a layer which imprisons air, whereas the internal layer 2 based on silica and alumina, and the outer layer 3 based on a silicone elastomer (in particular as sold by Dow Corning, General Electric, or Rhone-Poulenc, for example) constitute effective barriers for the air imprisoned in the ceramic braids.

For a hose 4 having an inside diameter of 20 mm and an outside diameter of 32 mm, a total outside diameter of 52 mm was obtained using the above-mentioned covering.

The hose coated in this way was subjected to fire resistance testing which essentially consisted in:

connecting the flexible hose covered with the covering of the invention to a circuit conveying a fluid for which the hose was designed (in particular constituted by water);

subjecting the circuit to an internal static pressure of 200 bars without fluid flow;

mounting the flexible hose in a U-shape over a receptacle containing combustible oil developing a temperature of 850° C. so that the distance between the surface of the oil and the lowest point of the hose is 30 cm; and detecting the temperatures in critical positions by means of thermocouples, in particular the temperature Te at the outside of the covering (at the lowest point of the U-shape and on the vertical sides of the U-shape) and the inside temperature Ti between the hose and its covering.

For the first prototype, a temperature Ti=300° C. was obtained and the hose contained the pressure of 200 bars throughout the test period (in particular for 6 minutes at 850° C.).

Thereafter, the hose was subjected to inspection for the purpose of establishing its pressure behavior after being subjected to the fire, and also its rupture pressure: the hose was capable of withstanding 400 bars for 1 minute and it burst only when subjected to a pressure of 830 bars, which is 30 bars higher than that required by the specifications.

In addition, certain mechanical properties of the flexible inside hose which is of the elastomer-based type were compared (without its protective covering) after the hose had been subjected to the fire test, with the same properties prior to the test.

The results are summarized in the following table:

|  | Before fire exposure | After exposure to fire |
|---|---|---|
| Hardness (Shore A) | 70 | 72 |
| Breaking strength (MPa) | 12.4 | 13.4 |
| Braking elongation (%) | 357 | 312 | from which it can be seen that there was no significant change in the properties of the inside hose which fully retained its hydrostatic capabilities in spite of being raised to a temperature of 300° C. on its outside surface for a period of 6 minutes.

The same fire resistance testing was performed on the second prototype 20 comprising a covering 15 that differs from the covering of the first prototype only by the presence of a third ceramic braid 1c and a second refractory layer 2b based on silica and alumina, the three ceramic braids 1a, 1b, and 1c alternating with the two refractory layers 2a and 2b, and with the entire covering being likewise covered by a film 3 based on fire-resistant silicone elastomer.

Applying the covering 15 gave a total outside diameter of 64 mm for the same 20 mm×32 mm hose (which means that adopting the minimum structure for the covering in the first prototype gives a reduction in total outside diameter of 12 mm=64 mm−52 mm).

The measured temperature Ti in the second prototype had a value Ti≈100° C., so this solution is advantageous when the fluids to be conveyed are temperature sensitive and cannot withstand the temperature rising to 300° C. as it did using the covering of the first prototype.

Naturally, the first prototype may be used whenever temperature constraints are not very strict.

Both prototypes were also subjected to tests seeking to measure the changes in dynamic stiffness of the hose fitted with a covering of the invention compared with a hose having no such covering, and in each case it was possible to observe that this change did not exceed, under the test conditions, a value of 10 dB, which is quite acceptable in this type of application.

It is recalled here that dynamic stiffness measurements are performed on the U-shaped hose bent round a minimum radius of curvature and over a length defined by the test specifications. One end of the U-shape is fixed while the other end is free and is subjected to the action of a force by means of a dynamic exciter. Under such conditions, the transmitted dynamic stiffness is defined as the ratio K of the force transmitted to the fixed end by displacing the free end.

Naturally, there are six such coefficients K, corresponding to the three possible displacements and the three possible rotations of the free end of the U-shape. These coefficients depend on the frequency of the displacements (linear or angular) as imposed in a frequency band lying in the range 10 Hz to 5000 Hz, for example. The stiffness K is measured in dB, and in particular as 20 log K.

A protective covering has been measured in this way and its exceptional performance is due to the fact that use is made of the exceptional thermal insulation properties of air when prevented from performing convection motion, and this is achieved in particular by splitting up the thickness of the covering into thin annular coverings which imprison the air and each of which is delimited on the outside by means of an air barrier so that the air is contained therein.

It should naturally be understood that each air barrier should not be considered as necessarily being airtight, but merely capable of preventing or considerably reducing motion of the air imprisoned in the above-mentioned thin annular compartments so that air does not pass or passes very little from one compartment to another.

This solution also confers exceptional flexibility to the covering such that application of the covering to a flexible elongate structure to be protected does not modify the flexibility thereof, overall, and modifies its dynamic stiffness only very little.

As can be seen from the above, the invention is not limited to the particular implementations, embodiments, and applications described in greater detail above. On the contrary, it extends to any variant that may occur to the person skilled in the art without going beyond the context or the scope of the present invention as defined by the claims. In particular, each application may also include an outer metal layer on the covering of the invention for the purpose of protecting that covering itself, which layer is advantageously made of a metal cloth, in particular a braid of stainless steel. This disposition enables the covering to remain intact after being accidentally exposed to fire while modifying the overall dynamic stiffness of the hose very little. This outer layer of metal cloth is shown in FIG. 3 and indicated by the reference character 8. It may also be used when the layer 3 of the two prototypes shown in FIGS. 1 and 2 is made on the basis of silica and alumina like the layer 2 or the layers 2a and 2b, instead of being made on the basis of a fire-resistant silicone elastomer. In other words all of the air-barrier layers may be made of the same material (and in particular made be made of a material based on silica and alumina), as when all of the air barriers are different from one another.

I claim:

1. In combination with a hose of a covering thereon serving as a protective element capable of maintaining operation of the hose when exposed to high temperature of at least 850° C. for at least several minutes and while providing little change to the dynamic stiffness thereof, said covering comprising:
    a first inner layer applied around and against said hose, said first inner layer being of braided construction and made of ceramic material and being so structured as to imprison air in its interior;
    a first intermediate layer surrounding said inner layer and formed of a film of an air impermeable fire-resistant silicone elastomer material forming a barrier for the air imprisoned within said first inner braided layer of ceramic material;
    a second intermediate layer applied against said first intermediate layer, on the outer surface thereof, said second intermediate layer also being of braided construction and also made of ceramic material and being so structured as to imprison air in its interior; and
    an outer layer which covers said second intermediate layer, said outer layer being of a film of an air impermeable fire-resistant silicone elastomer material so as to form a barrier for the air imprisoned within said second intermediate braided layer of ceramic material.

2. In a hose according to claim 1, further comprising on the external surface of said outer layer a metal based braided sleeve for protecting said outer layer.

3. In a hose according to claim 2 wherein said metal based braided sleeve is formed of stainless steel.

4. In a hose according to claim 1 further comprising between said second intermediate layer and said outer layer;
    a third intermediate layer applied against said second intermediate layer on the outer surface thereof, said third intermediate layer being made of a film of an air impermeable fire-resistant silicone elastomer material forming a barrier for the air imprisoned within said second intermediate layer; and
    a fourth intermediate layer surrounding said third intermediate layer and applied against the outer surface thereof, said fourth intermediate layer being of braided construction and made of ceramic material and being so structured as to imprison air in its interior.

* * * * *

UNITED STATES PATENT AND TRADEMARK OFFICE
CERTIFICATE OF CORRECTION

PATENT NO. : 5,183,079
DATED : February 2, 1993
INVENTOR(S) : Philippe Blin

It is certified that error appears in the above-indentified patent and that said Letters Patent is hereby corrected as shown below:

On the title page, after the last line of the Abstract, the number of drawing sheets should be changed to read as follows:
--2 Drawing Sheets--.

In the Drawings, Fig. 3 should be added as shown on the attached page.

Signed and Sealed this

Fifteenth Day of March, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,183,079

DATED : February 2, 1993

INVENTOR(S) : Philippe Blin

It is certified that error appears in the above-indentified patent and that said Letters Patent is hereby corrected as shown below:

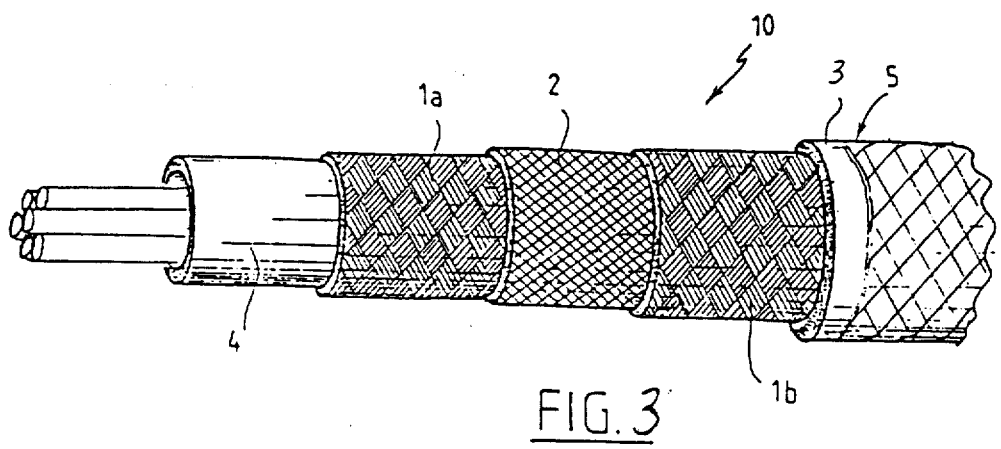

FIG. 3